(12) United States Patent
Watanabe et al.

(10) Patent No.: US 11,553,109 B2
(45) Date of Patent: Jan. 10, 2023

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Ayako Watanabe, Kanagawa (JP); Masahiko Kubo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/459,647

(22) Filed: Aug. 27, 2021

(65) Prior Publication Data
US 2022/0377204 A1 Nov. 24, 2022

(30) Foreign Application Priority Data
May 19, 2021 (JP) .............................. JP2021-084914

(51) Int. Cl.
| | |
|---|---|
| *H04N 1/60* | (2006.01) |
| *G01J 3/46* | (2006.01) |
| *G01J 3/50* | (2006.01) |
| *G03G 15/00* | (2006.01) |
| *G03G 15/01* | (2006.01) |

(52) U.S. Cl.
CPC ............ *H04N 1/6008* (2013.01); *G01J 3/462* (2013.01); *G01J 3/50* (2013.01); *G03G 15/01* (2013.01); *G03G 15/50* (2013.01); *H04N 1/6022* (2013.01)

(58) Field of Classification Search
CPC ..... H04N 1/6008; H04N 1/6022; G01J 3/462; G01J 3/50; G03G 15/01; G03G 15/50
USPC .................. 358/1.9, 1.15, 501, 515
See application file for complete search history.

(56) References Cited

U.S. PATENT DOCUMENTS

| | | | |
|---|---|---|---|
| 9,116,452 B2 | 8/2015 | Koyatsu et al. | |
| 2013/0286440 A1* | 10/2013 | Okumura | H04N 1/54 358/3.06 |
| 2015/0117875 A1* | 4/2015 | Kubo | G03G 15/5029 399/15 |

FOREIGN PATENT DOCUMENTS

JP    5910405 B2    4/2016

* cited by examiner

*Primary Examiner* — Quang N Vo
(74) *Attorney, Agent, or Firm* — Oliff PLC

(57) ABSTRACT

An image processing apparatus includes a processor configured to: store a first color patch used in using metallic toner and a second color patch used in using CMYK toner other than the metallic toner without using the metallic toner; receive a first colorimetric value obtained by measuring color of the first color patch and a second colorimetric value obtained by measuring color of the second color patch; calculate a third colorimetric value on a basis of the first colorimetric value obtained by measuring the color of the first color patch and the second colorimetric value obtained by measuring the color of the second color patch, and generate a profile to be used to convert an input color value into an output color value, the profile being generated on a basis of the third colorimetric value; and calculate the third colorimetric value that ranges from the first colorimetric value to the second colorimetric value in response to a total amount of CMYK toner being lower than or equal to a threshold, the total amount of the CMYK toner resulting from color conversion of the input color value performed by using the profile, and calculate the third colorimetric value that coincides with the first colorimetric value in response to the total amount exceeding the threshold.

12 Claims, 5 Drawing Sheets

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-084914 filed May 19, 2021.

BACKGROUND

(i) Technical Field

The present disclosure relates to an image processing apparatus and a non-transitory computer readable medium.

(ii) Related Art

Japanese Patent No. 5910405 discloses an image processing apparatus including a printer, a normal color conversion unit, a metallic-toner-amount calculation unit, a metallic-level designation receiving unit, a metallic color conversion unit, and a printing execution unit. The printer performs printing by using process color toner of at least one process color and metallic toner. The normal color conversion unit converts an input color value into an amount of the process color toner based on a color reproduction characteristic of the printer at the time of printing without the metallic toner. For each of metallic levels, the metallic-toner-amount calculation unit calculates the amount of the metallic toner based on the metallic level. The metallic-level designation receiving unit receives the designation of the metallic level. The metallic color conversion unit performs color conversion of the input color value such that the colorimetric value of a first result of the printing by the printer is close to the colorimetric value of a second result of the printing. The first result is obtained by the printing by using the process color toner and the metallic toner. The process color toner has an amount resulting from the color conversion of the input color value performed on the basis of the metallic level designated to be received by the metallic-level designation receiving unit. The metallic toner has an amount obtained by the metallic-toner-amount calculation unit on the basis of the designated metallic level. The second result is obtained by the printing by using the process color toner having an amount resulting from the conversion of the input color value performed by the normal color conversion unit. The printing execution unit causes the printer to perform the printing in the following manner when a metallic mode is designated. The printing is performed by inputting the respective amounts of the process color toner and the metallic toner to the printer. The amount of the process color toner results from the conversion of the input color value performed by the metallic color conversion unit on the basis of the metallic level designated to be received by the metallic-level designation receiving unit. The amount of the metallic toner is obtained on the basis of the metallic level by the metallic-toner-amount calculation unit.

SUMMARY

In a case where a metallic toner amount is increased in a highlight portion having a low CMYK toner amount to enhance a metallic feel, the opacity of the metallic toner causes dark diffused light. The highlight portion thus does not measure a bright value in the measurement with a colorimeter, unlike the impression from visual observation. In such a condition, color conversion performed by using a profile generated on the basis of the colorimetric value measured with the colorimeter leads to an unnatural impression in the color reproduction of the highlight portion.

Aspects of non-limiting embodiments of the present disclosure relate to an image processing apparatus and a non-transitory computer readable medium by which even if a metallic toner amount in the highlight portion is increased to enhance a metallic feel of the highlight portion, a highlight portion having metallic toner measures a bright value in color reproduction and thus has a natural impression in the color reproduction after color conversion using a profile, as compared to a case where the same color patch is used regardless of a CMYK toner amount.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image processing apparatus including a processor configured to: store a first color patch used in using metallic toner and a second color patch used in using CMYK toner other than the metallic toner without using the metallic toner; receive a first colorimetric value obtained by measuring color of the first color patch and a second colorimetric value obtained by measuring color of the second color patch; calculate a third colorimetric value on a basis of the first colorimetric value obtained by measuring the color of the first color patch and the second colorimetric value obtained by measuring the color of the second color patch, and generate a profile to be used to convert an input color value into an output color value, the profile being generated on a basis of the third colorimetric value; and calculate the third colorimetric value that ranges from the first colorimetric value to the second colorimetric value in response to a total amount of CMYK toner being lower than or equal to a threshold, the total amount of the CMYK toner resulting from color conversion of the input color value performed by using the profile, and calculate the third colorimetric value that coincides with the first colorimetric value in response to the total amount exceeding the threshold.

BRIEF DESCRIPTION OF THE DRAWINGS

An exemplary embodiment of the present disclosure will be described in detail based on the following figures, wherein.

DETAILED DESCRIPTION

First Exemplary Embodiment

Figure 1:
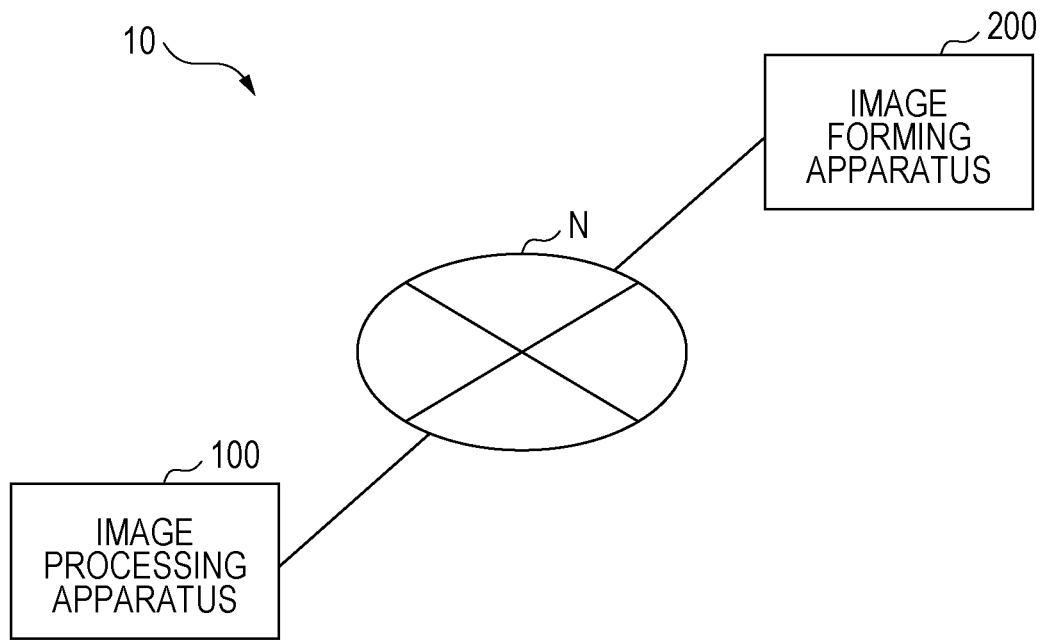
FIG. 1 is a schematic configuration diagram of an image processing system according to an exemplary embodiment of the present disclosure.

Hereinafter, an example of an exemplary embodiment of the present disclosure will be described with reference to the drawings. The same or equivalent components and parts are denoted by the same reference numerals throughout the drawings. The ratio of the dimensions of each drawings is exaggerated for convenience of explanation and is different from the actual ratio on occasions.

FIG. 1 is a diagram illustrating a schematic configuration of an image processing system 10 according to this exemplary embodiment.

As illustrated in FIG. 1, the image processing system 10 includes an image processing apparatus 100 and an image forming apparatus 200 that are connected to a communication medium such as a network N. Various networks such as a local area network (LAN), a wide area network (WAN), the Internet, an intranet, and Ethernet (registered trademark) may be applied to the communication medium (described later). Although FIG. 1 illustrates an example of one image processing apparatus 100 and one image forming apparatus 200, the number of apparatuses is not limited to these numbers. In this exemplary embodiment, the image processing apparatus 100 is a personal computer (PC). The image forming apparatus 200 has various functions such as a printing function. The image forming apparatus 200 may have a copying function, a faxing function, a scanning function, and other functions in addition to the printing function.

Figure 2:
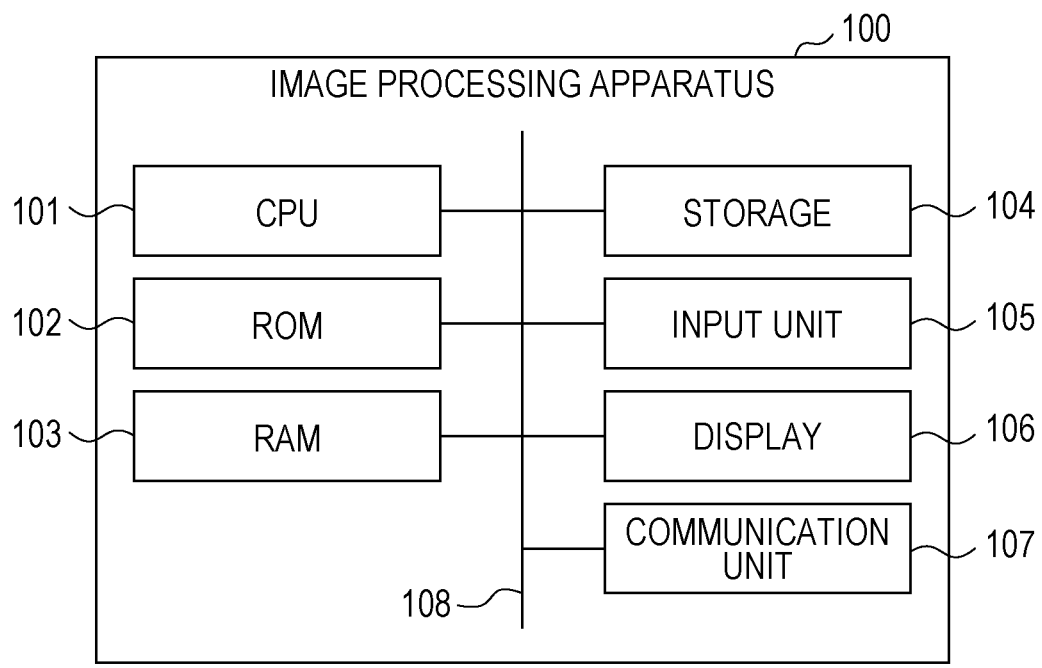
FIG. 2 is a schematic block diagram of an image processing apparatus according to the exemplary embodiment of the present disclosure.

FIG. 2 is a block diagram illustrating the hardware configuration of the image processing apparatus 100 according to this exemplary embodiment.

As illustrated in FIG. 2, the image processing apparatus 100 includes a central processing unit (CPU) 101 that is an example of a processor, a read only memory (ROM) 102, a random access memory (RAM) 103, a storage 104, an input unit 105, a display 106, and a communication unit 107. The components are connected to be able to communicate with each other via a bus 108.

The CPU 101, for example, runs various programs and performs control of the components. Specifically, the CPU 101 reads out a program from the ROM 102 or the storage 104 and runs the program by using the RAM 103 as a work area. The CPU 101 performs the control of the components and various arithmetic processing in accordance with the program recorded in the ROM 102 or the storage 104. In this exemplary embodiment, the ROM 102 or the storage 104 stores the programs.

The ROM 102 stores various programs and pieces of data. The RAM 103 serves as the work area and temporarily stores a program or data. The storage 104 is configured as a hard disk drive (HDD) or a solid state drive (SSD) and stores various programs including the operating system and pieces of data.

The input unit 105 includes a pointing device such as a mouse and a keyboard and is used to perform various input operations.

The display 106 is an example of a first device and is, for example, a liquid crystal display. The display 106 displays various pieces of information under the control of the CPU 101. The display 106 may use a touch panel system and thereby function as the input unit 105. In the description herein, the liquid crystal display is used as an input device.

The communication unit 107 is used to communicate with the image forming apparatus 200 and other apparatuses such as a server apparatus (not illustrated), and a standard such as for a LAN, a public network, the Internet, or an intranet, Ethernet (registered trademark), Fiber Distributed Data Interface (FDDI), or Wi-Fi (registered trademark) is used.

Figure 3:
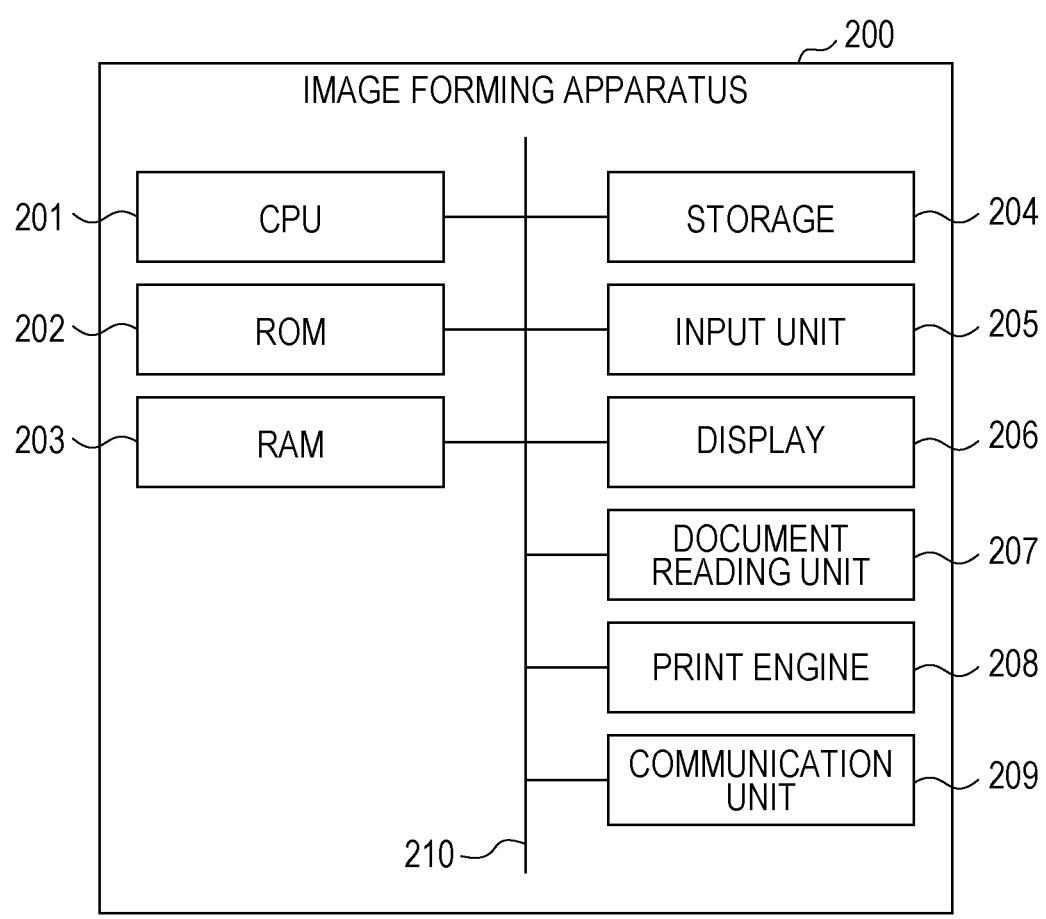
FIG. 3 is a schematic block diagram of an image forming apparatus according to the exemplary embodiment of the present disclosure.

FIG. 3 is a block diagram illustrating the hardware configuration of the image forming apparatus 200 according to this exemplary embodiment.

As illustrated in FIG. 3, the image forming apparatus 200 includes a CPU 201 that is an example of the processor, a ROM 202, a RAM 203, a storage 204, an input unit 205, a display 206, a document reading unit 207, a print engine 208, and a communication unit 209. The components are connected to be able to communicate with each other via a bus 210.

The CPU 201, for example, runs various programs and performs control of the components. Specifically, the CPU 201 reads out a program from the ROM 202 or the storage 204 and runs the program by using the RAM 203 as a work area. The CPU 201 performs the control of the components and various arithmetic processing in accordance with the program recorded in the ROM 202 or the storage 204. In this exemplary embodiment, the ROM 202 or the storage 204 stores the programs.

The ROM 202 stores various programs and pieces of data. The RAM 203 serves as the work area and temporarily stores a program or data. The storage 204 is configured as a HDD or a SSD and stores various programs including the operating system and pieces of data.

The input unit 205 includes a pointing device such as a mouse and a keyboard and is used to perform various input operations.

The display 206 is, for example, a liquid crystal display. The display 206 displays various pieces of information under the control of the CPU 201. The display 206 may use a touch panel system and thereby function as the input unit 205.

The document reading unit 207 takes in documents placed on the sheet feeder of an auto document feeder (not illustrated) provided in the upper portion of the image forming apparatus 200 one by one and optically reads each document taken in to acquire image information. Alternatively, the document reading unit 207 optically reads a document placed on a flat bed such as a platen glass to acquire image information.

The print engine 208 forms, that is, prints, on a recording medium such as a paper sheet, an image based on the image information acquired from the image processing apparatus 100 or the image information acquired by the reading by the document reading unit 207.

The communication unit 209 is used to communicate with the image processing apparatus 100 and other apparatuses such as a server apparatus (not illustrated), and a standard such as for a LAN, a public network, the Internet, or an intranet, Ethernet (registered trademark), FDDI, or Wi-Fi (registered trademark) is used.

The communication unit 209 also connects the image forming apparatus 200 to a public network and transmits and receives the image information acquired by a different image forming apparatus having the faxing function or acquired by the reading by the document reading unit 207.

Figure 4:
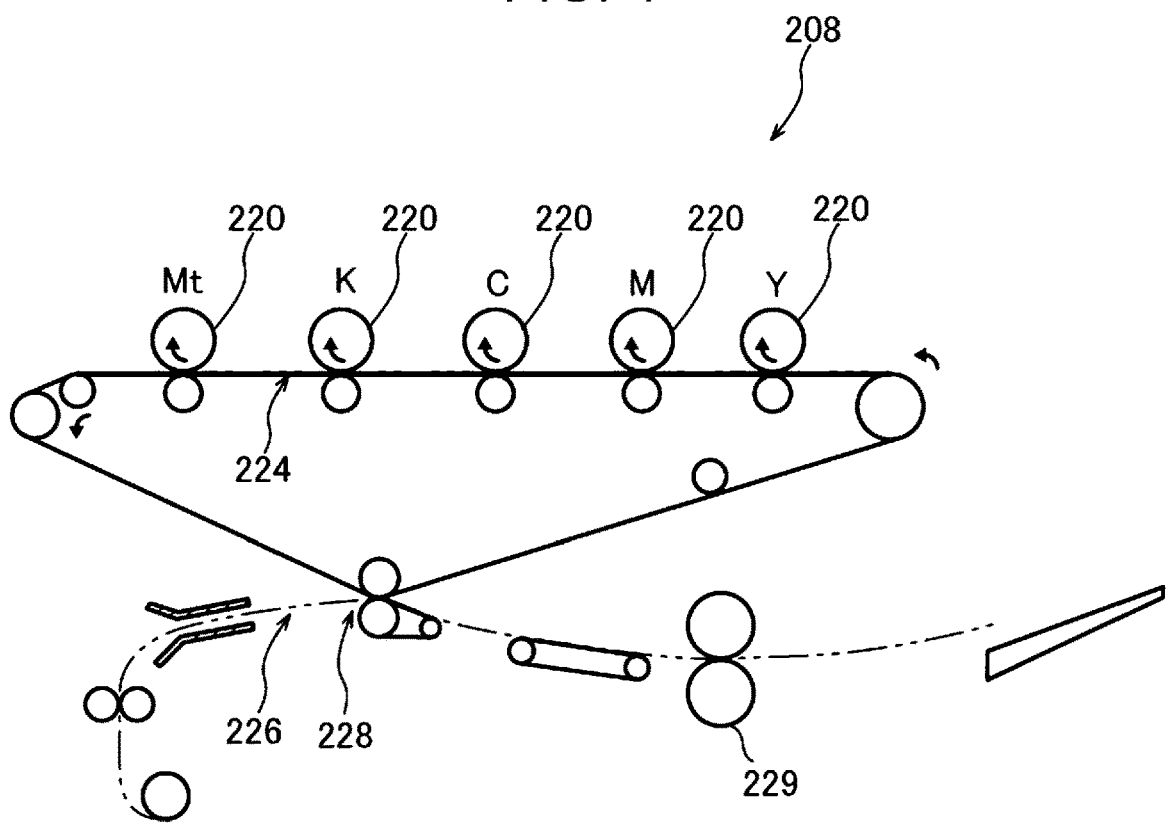
FIG. 4 is an explanatory view for explaining an example configuration of a print engine of the image forming apparatus according to the exemplary embodiment of the present disclosure.

FIG. 4 schematically illustrates an example configuration of the print engine 208 included in the image forming apparatus 200 of this exemplary embodiment. The print engine 208 in this example is an electrophotographic full color print engine employing an intermediate transfer system and uses toner of color components as color materials. The print engine 208 has a tandem photoconductor arrangement configuration. In the photoconductor arrangement configuration, a photoconductor 220 for metallic toner Mt for adding a metallic feel is disposed downstream of photoconductors 220 for CMYK toner for respective colors of C, M, Y, and K.

The metallic feel is herein a metallic shiny appearance. A metallic luster feel provided by regular reflection of light from a smooth metal surface and a sparkle feel which is brilliant shining are collectively called the metallic feel. The brilliant shining is provided in accordance with changes in direction of incident light on fine cut surfaces of metal or the like facing various directions or a collection of metal pieces.

In the example in FIG. 4, toner images formed on the respective photoconductors 220 are transferred (first transfer) in an aligned manner on an intermediate transfer belt 224 in the order of Y, M, C, K, and Mt from the upstream side to the downstream side in the travelling direction of the intermediate transfer belt 224. A full-color toner image having the layer of the metallic toner Mt and the layers of the YMCK toner arranged below the layer of the metallic toner Mt is thereby formed on the intermediate transfer belt 224. The full-color toner image is transferred (second transfer) on a printing medium 5 (for example, a sheet of paper) on a second transfer unit 228. The printing medium 5 is transported by a medium transport system 226. The full-color toner image having the layer of the metallic toner Mt formed below the layers of YMCK toner is thus formed on the surface of the printing medium 5. The full-color toner image is fixed on the printing medium 5 by a fixing unit 229.

Note that in the example in FIG. 4, the arrangement order of the photoconductors 220 for the CMYK toner is Y, M, C, and K from the upstream side; however, this order is merely an example. In addition, a case where the photoconductor 220 for the metallic toner Mt is disposed upstream of the YMCK photoconductors 220 is not excluded.

The metallic toner Mt includes silver toner (Si) and gold toner (G). In the description of this exemplary embodiment, the silver toner (Si) is used.

The image processing apparatus 100 implements various functions by using the hardware resources described above.

The functional configuration implemented by the image processing apparatus 100 will be described.

Figure 5:
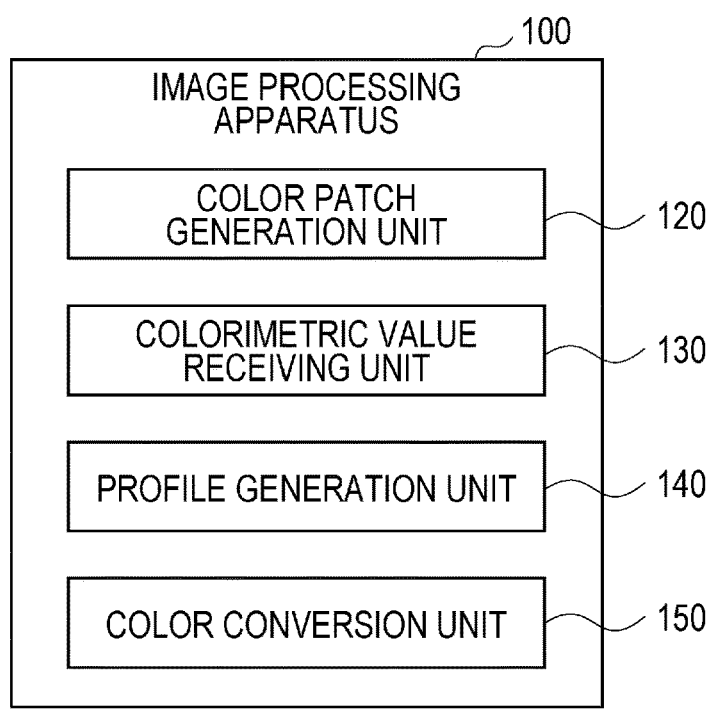
FIG. 5 is a block diagram illustrating an example functional configuration of the image processing apparatus according to the exemplary embodiment of the present disclosure.

FIG. 5 is a block diagram illustrating an example functional configuration of the image processing apparatus 100.

As illustrated in FIG. 5, the image processing apparatus 100 includes a color patch generation unit 120, a colorimetric value receiving unit 130, a profile generation unit 140, and a color conversion unit 150 as functional components. The functional components are implemented in such a manner that the CPU 101 reads out a program stored in the ROM 102 or the storage 104 and runs the program.

Color Patch Generation Unit 120

The CPU 101 of the image processing apparatus 100 stores a first color patch used in using the metallic toner and a second color patch used in using the CMYK toner other than the metallic toner without using the metallic toner.

Specifically, the first color patch is generated for any combination of a color of the CMYK toner and the color of the metallic toner Mt in the image forming apparatus 200 and then printed by the image forming apparatus 200. The second color patch is also generated for any combination of colors of the CMYK toner other than the metallic toner Mt and then printed by the image forming apparatus 200. A first colorimetric value ($L^*a^*b^*$) and a second colorimetric value ($L^*a^*b^*$) are respectively obtained by measuring the first color patch and the second color patch with a colorimeter (not illustrated). In this exemplary embodiment, the first colorimetric value and the second colorimetric value are obtained as CIE $L^*a^*b^*$ values of a device-independent colorimetric system. In addition, each color patch is measured with the colorimeter in a diffusing direction (45 degrees) from the illumination in this exemplary embodiment. The measurement is not limited to the measurement in the diffusing direction (45 degrees) from the illumination and may be performed at a different angle or angles.

Colorimetric Value Receiving Unit 130

The colorimetric value receiving unit 130 receives the first colorimetric value ($L^*a^*b^*$) and the second colorimetric value ($L^*a^*b^*$) respectively obtained by measuring the first color patch and the second color patch with the colorimeter.

Profile Generation Unit 140

The profile generation unit 140 calculates a third colorimetric value on the basis of the first colorimetric value obtained by measuring the color of the first color patch using the metallic toner Mt and the second colorimetric value obtained by measuring the color of the second color patch not using the metallic toner Mt. The profile generation unit 140 then generates a profile for converting an input color value into an output color value on the basis of the third colorimetric value.

A known method is used as a profile generation method performed on the basis of the colorimetric values by the profile generation unit 140. For example, an $L^*a^*b^*$ colorimetric value is obtained by measuring the color of the color patch for a combination of colors of the CMYK toner serving as the output color value, and thereby a pair of the C, M, Y, and K value and the $L^*a^*b^*$ value is obtained. With the use of the pair, the function "$(L^*, a^*, b^*)=f(C, M, Y, K)$" is obtained. By using this, a profile may thus be generated by a publicly known method. A CMYK value serving as the output color value may be obtained from an input color value $L^*a^*b^*$ by using the profile. A general function such as interpolation using a multiple regression equation, a neural network, a direct look up table, or the like may be used as the function used in generating the profile. The profile is a color conversion parameter for a publicly known color conversion method represented by an ICC profile or the like. Specifically, the direct look up table for outputting a CMYK value serving as the output color value from an L*a*b* value serving as the input color value is typically used; however, the color conversion method is not limited to the use of only the direct look up table, and a different method such as matrix conversion may be used.

The profile generation unit 140 generates the profile from the third colorimetric value calculated on the basis of the first colorimetric value and the second colorimetric value. By using the profile, the output color value (C, M, Y, K) is calculated from the input color value (L*a*b*).

The third colorimetric value is specifically described.

If a CMYK toner amount serving as the total amount of the components of the color value (C, M, Y, K) of the CMYK color after conversion using the profile is lower than or equal to a first threshold, a third colorimetric value Lab3 is calculated by using Formula 1 below:

$$Lab3 = (1.0 - rate) * Lab2 + rate * Lab1,$$

where rate is a CMYK toner amount/the first threshold, Lab1 is the first colorimetric value in the use of the metallic toner Mt, and Lab2 is the second colorimetric value without the use of the metallic toner Mt. The first threshold is a threshold for setting a highlight portion measuring a dark first colorimetric value in the use of the metallic toner Mt in the measurement with the colorimeter and is 100% in this exemplary embodiment. Note that the first threshold is not limited to 100% but preferably be in a range, for example, from 50% to 150%.

That is, since the highlight portion having the CMYK toner amount lower than or equal to the first threshold measures the dark value in the colorimeter measurement due to the influence of the metallic toner Mt, the third colorimetric value is calculated according to Formula 1 above in the following manner by using the first colorimetric value in the use of the metallic toner Mt causing the dark colorimetric value and the second colorimetric value without the use of the metallic toner Mt causing a bright appearance. If the CMYK toner amount is 0%, the third colorimetric value coincides with the second colorimetric value. If the CMYK toner amount is equal to the first threshold, the third colorimetric value coincides with the first colorimetric value. If the CMYK toner amount exceeds 0% and is lower than or equal to the first threshold, interpolation is performed linearly from the first colorimetric value to the second colorimetric value.

If the CMYK toner amount exceeds the first threshold, the third colorimetric value is calculated by using Formula 2 below:

$$Lab3 = Lab1.$$

That is, if the CMYK toner amount exceeds the first threshold, the first colorimetric value in the use of the metallic toner Mt is used as the third colorimetric value without any additional calculation. If the CMYK toner amount exceeds the first threshold, the use of the first threshold to decide the profile enables the influence of the metallic toner Mt on the color reproduction to be corrected by using the CMYK toner amount and thus enables color reproduction close to the input color value.

Subsequently, the profile is generated by a known method by using the third colorimetric value Lab3 calculated on the basis of Formula 1 or 2 above.

Color Conversion Unit 150

The color conversion unit 150 first converts image data such as RGB data to be printed by the image forming apparatus 200 into a CMYK color space having the four primary colors of printing and thereby generates image data of four CMYK colors.

To perform printing by using the metallic toner Mt, the color conversion unit 150 uses the profile and thereby performs the conversion into the color value (C, M, Y, K) in the profile. In addition, a metallic toner amount relative to the CMYK toner amount (described later) is calculated from the color value (C, M, Y, K) resulting from the conversion by using the profile.

Each component of the color value (C, M, Y, K, Mt) of the process color after the conversion by the color conversion unit 150 corresponds to the density (a toner amount per pixel) of the color toner of a corresponding one of C, M, Y, K, and Mt.

The color value (C, M, Y, K, Mt) of each pixel obtained by the color conversion unit 150 is output to the print engine 208, and an image is formed by controlling exposure to the photoconductors 220 for respective C, M, Y, K, and Mt.

Figure 6:
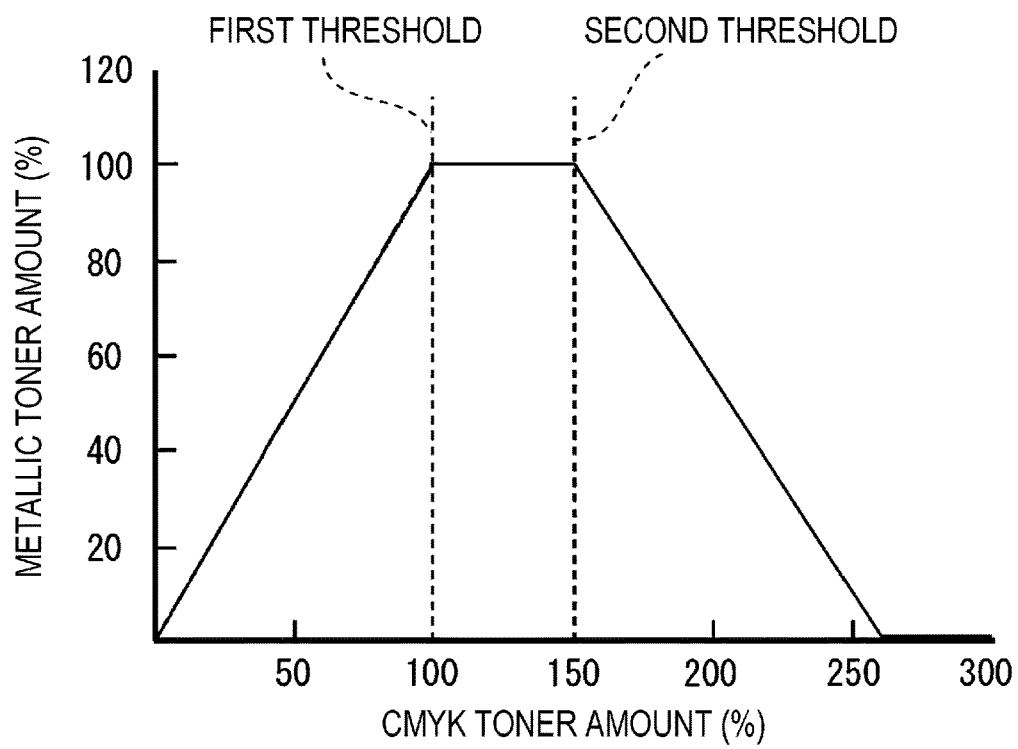
FIG. 6 is a graph illustrating an example relationship between a metallic toner amount and a CMYK toner amount serving as the total amount of the components of a color value (cyan (C), magenta (M), yellow (Y), black (K)) of a CMYK color after color conversion performed using a profile described in the related art.

FIG. 6 illustrates an example relationship between the metallic toner amount and the CMYK toner amount serving as the total amount of the components of the color value (C, M, Y, K) of the CMYK color after the color conversion performed using the profile described in the related art. In the illustrated function, the metallic toner amount is increased linearly from 0% to 100% that is an example of the first threshold in the CMYK toner amount range from 0% to 100%, has a fixed value "the metallic toner amount=100%" in the CMYK toner amount range from 100% to 150% that is an example of the second threshold, and is decreased linearly from 100% to 0% in the CMYK toner amount range from 150% to 260%. The metallic toner amount is decreased from the first threshold to a 0% CMYK toner amount as described above, the highlight portion thereby measures a bright colorimetric value close to the appearance. Accordingly, even in a case where the profile is generated by using only the first colorimetric value in the use of the metallic toner Mt, the color reproduction of the highlight portion provides a natural impression. However, according to FIG. 6, a low amount of the metallic toner amount in the highlight portion deteriorates the metallic feel of the highlight portion.

Note that as long as the CMYK toner amount and the metallic toner amount have the correlation as illustrated in FIG. 6, the amounts are not limited to the amounts illustrated in FIG. 6.

Figure 7:
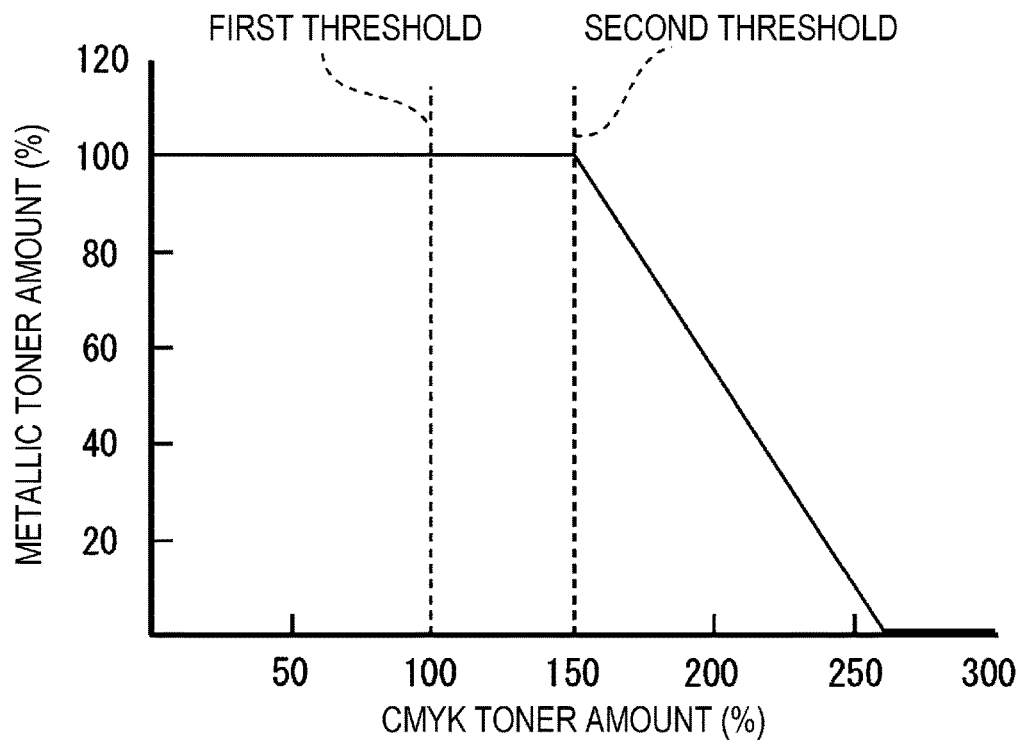
FIG. 7 is a graph illustrating an example relationship between the metallic toner amount and the CMYK toner amount serving as the total amount of the components of the color value (C, M, Y, K) of a process color after color conversion performed using a profile according to the exemplary embodiment of the present disclosure.

FIG. 7 illustrates an example relationship between the metallic toner amount and the CMYK toner amount serving as the total amount of the components of the color value (C, M, Y, K) of a process color after the color conversion performed using the profile of the present disclosure. In the illustrated relationship, the metallic toner amount has a fixed value of 100% in the CMYK toner amount range from 0% to 150% and is decreased linearly from 100% to 0% in the CMYK toner amount range from 150% to 260%.

Note that as long as the CMYK toner amount and the metallic toner amount have the correlation as illustrated in FIG. 7, the amounts are not limited to the amounts illustrated in FIG. 7.

In FIG. 7, the use of the profile generated by using the first colorimetric value and the second colorimetric value leads to correction of the colorimetric value for a portion having a low CMYK toner amount compared to the first threshold to a value closer to the second colorimetric value without the use of the metallic toner Mt. Even if the metallic toner amount is increased, the highlight portion having the low CMYK toner amount does not measure a dark colorimetric value as the result of the correction, and the color conversion using the profile provides more natural color reproduction. In addition, in the area from the 0% CMYK toner amount to the first threshold in FIG. 7, the metallic toner amount is higher than that in FIG. 6, and thus a strong metallic feel is provided in the highlight portion.

In the examples in FIGS. 6 and 7, the metallic toner amount is gradually decreased in the range in which the CMYK toner amount exceeds 150% that is the second threshold with the increase of the CMYK toner amount. The metallic toner amount is gradually decreased to ensure the color reproducibility of a shadow portion. If the metallic toner amount is increased in the shadow portion having a high CMYK toner amount, color reproduction with high density is not achieved due to the influence of the metallic toner. However, if the metallic toner amount in the shadow portion having the high CMYK toner amount is decreased, the reproduction with high density is achieved.

Actions of the image processing apparatus 100 will then be described.

Figure 8:
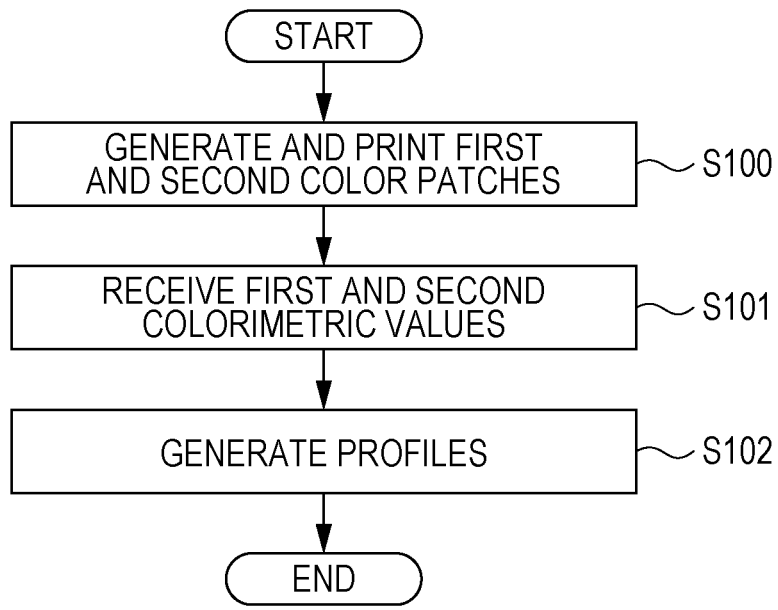
FIG. 8 is a flowchart illustrating an example of a profile generation process by the image forming apparatus according to the exemplary embodiment of the present disclosure.

FIG. 8 is a flowchart illustrating an example of the operation of the image processing apparatus 100 in profile generation.

In step S100, the CPU 101 (color patch generation unit 120) generates the first color patch and the second color patch and causes the image forming apparatus 200 to perform printing to generate a profile. The processing then proceeds to subsequent step S101.

In step S101, the CPU 101 (colorimetric value receiving unit 130) receives the results (the first colorimetric value and the second colorimetric value) of the colorimetry performed with the colorimeter on the color patches printed in step S100. The processing then proceeds to subsequent step S102.

In step S102, the CPU 101 (profile generation unit 140) generates and stores profiles (a first profile, a second profile, and a third profile) on the basis of the colorimetric values received in step S101. The processing is then terminated.

Figure 9:
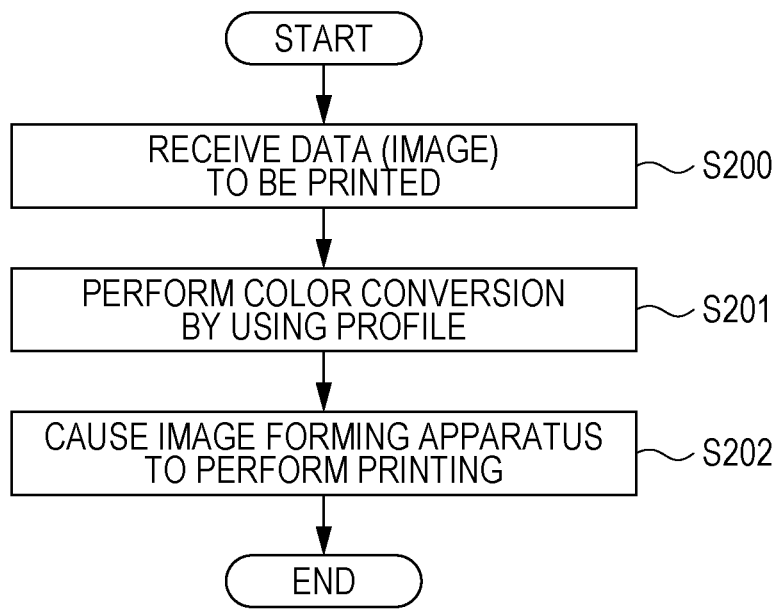
FIG. 9 is a flowchart illustrating an example of a color conversion process by the image forming apparatus according to the exemplary embodiment of the present disclosure.

FIG. 9 is a flowchart illustrating an example of the operation of the image processing apparatus 100 in the color conversion using the generated profile.

In step S200, data (an image) to be printed is received. The operation in this step is not limited to the receiving of the data to be printed by the image processing apparatus 100, and data to be printed may be generated. The processing then proceeds to subsequent step S201.

In step S201, by using the profile generated and stored in step S102 in FIG. 8, color conversion is performed on the data to be printed, and the values of respective color components (C', M', Y', K', and Si) are calculated. The processing then proceeds to subsequent step S202.

In step S202, the image forming apparatus 200 performs printing on the basis of the color components (C', M', Y', K', and Si) having undergone the color conversion in step S201. The processing is then terminated.

For the exemplary embodiment above, the aspect in which the image processing program is stored (installed) in advance in the ROM 102 or the storage 104 has been described; however, the exemplary embodiment is not limited to the aspect. The program may be provided in such a manner as to be stored in a recording medium such as a compact disk read only memory (CD-ROM), a digital versatile disk read only memory (DVD-ROM), or a universal serial bus (USB) memory. The program may be downloaded from an external apparatus via the network N.

The present disclosure is not limited to the exemplary embodiment described above, and various modifications and applications may be made without departing from the spirit of the disclosure.

For example, the CPU 201 of the image forming apparatus 200 may implement the function of the color conversion unit 150 of the image processing apparatus 100.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
store a first color patch used in using metallic toner and a second color patch used in using CMYK toner other than the metallic toner without using the metallic toner;
receive a first colorimetric value obtained by measuring color of the first color patch and a second colorimetric value obtained by measuring color of the second color patch; and
calculate a third colorimetric value on a basis of the first colorimetric value obtained by measuring the color of the first color patch and the second colorimetric value obtained by measuring the color of the second color patch, and generate a profile to be used to convert an input color value into an output color value, the profile being generated on a basis of the third colorimetric value,
wherein in calculating the third colorimetric value:
in response to a total amount of CMYK toner being lower than or equal to a threshold, the total amount of the CMYK toner resulting from color conversion of the input color value performed by using the profile, the processor calculates the third colorimetric value in a first way so that the third colorimetric value ranges from the first colorimetric value to the second colorimetric value, and
in response to the total amount of the CMYK toner exceeding the threshold, the processor calculates the third colorimetric value in a second way different from the first way so that the third colorimetric value coincides with the first colorimetric value.

2. The image processing apparatus according to claim 1, wherein the processor is configured to:
    decide a metallic toner amount on a basis of the total amount of the CMYK toner resulting from the color conversion.

3. The image processing apparatus according to claim 1, wherein the processor is configured to:
    in response to the total amount of the CMYK toner being lower than or equal to the threshold, calculate the third colorimetric value that is closer to the second colorimetric value for a lower total amount of the CMYK toner or that is closer to the first colorimetric value for a higher total amount of the CMYK toner.

4. The image processing apparatus according to claim 2, wherein the processor is configured to:
    in response to the total amount of the CMYK toner being lower than or equal to the threshold, calculate the third colorimetric value that is closer to the second colorimetric value for a lower total amount of the CMYK toner or that is closer to the first colorimetric value for a higher total amount of the CMYK toner.

5. The image processing apparatus according to claim 3, wherein the processor is configured to:
    in response to the total amount of the CMYK toner being 0%, calculate the third colorimetric value that coincides with the second colorimetric value.

6. The image processing apparatus according to claim 4, wherein the processor is configured to:
    in response to the total amount of the CMYK toner being 0%, calculate the third colorimetric value that coincides with the second colorimetric value.

7. The image processing apparatus according to claim 2, wherein the processor is configured to:
    decide the metallic toner amount to increase the metallic toner amount as the total amount of the CMYK toner is decreased.

8. The image processing apparatus according to claim 2, wherein the processor is configured to:
    when the metallic toner amount is decided, perform correction to increase the metallic toner amount in a range in which the total amount of the CMYK toner is lower than or equal to the threshold, the metallic toner amount being increased as compared with a metallic toner amount in a range in which the total amount of the CMYK toner exceeds the threshold.

9. A non-transitory computer readable medium storing an image processing program causing a computer to function as the image processing apparatus according to claim 1.

10. The image processing apparatus according to claim 1, wherein the threshold is a value in a range from 50% to 150%.

11. The image processing apparatus according to claim 1, wherein:
    an amount for the metallic toner has a fixed value of 100% with the total amount of the CMYK toner being in a range from 0% to 150%, and
    the amount for the metallic toner is decreased linearly from 100% to 0% with the total amount of the CMYK toner being in a range from 150% to 260%.

12. An image processing apparatus comprising:
    means for storing a first color patch used in using metallic toner and a second color patch used in using CMYK toner other than the metallic toner without using the metallic toner;
    means for receiving a first colorimetric value obtained by measuring color of the first color patch and a second colorimetric value obtained by measuring color of the second color patch; and
    means for calculating a third colorimetric value on a basis of the first colorimetric value obtained by measuring the color of the first color patch and the second colorimetric value obtained by measuring the color of the second color patch, and generate a profile to be used to convert an input color value into an output color value, the profile being generated on a basis of the third colorimetric value,
    wherein in calculating the third colorimetric value:
        in response to a total amount of CMYK toner being lower than or equal to a threshold, the total amount of the CMYK toner resulting from color conversion of the input color value performed by using the profile, the third colorimetric value is calculated in a first way so that the third colorimetric value ranges from the first colorimetric value to the second colorimetric value, and
        in response to the total amount of the CMYK toner exceeding the threshold, the third colorimetric value is calculated in a second way different from the first way so that the third colorimetric value coincides with the first colorimetric value.

* * * * *